United States Patent Office 3,526,473
Patented Sept. 1, 1970

3,526,473
PROCESS FOR CONDITIONING TANNED SHARK-SKIN AND ARTICLES MADE THEREFROM
Frank A. Burgett and Jerry C. Poradek, Houston, Tex., assignors to the United States of America as represented by the Administrator of the National Aeronautics and Space Administration
No Drawing. Filed June 19, 1968, Ser. No. 738,119
Int. Cl. C14c *11/00, 5/00*
U.S. Cl. 8—94.12
1 Claim

ABSTRACT OF THE DISCLOSURE

A process for conditioning tanned sharkskin so that it will have a high degree of abrasion resistance and pliability over extreme temperature ranges (−250° F. to 300° F.) and be substantially free of undesirable fish odor. The process includes removing the oil with a solvent, providing a thorough air drying, applying a deodorizer to the oil-free skin, providing a second thorough air drying, and a short preshrink bakeout. Articles such as boots or gloves made from such materials are abrasive resistant, durable, and pilable.

---

The invention described herein was made by employees of the United States Government and may be manufactured and used by or for the Government for governmental purposes without the payment of any royalties thereon or therefor.

This invention relates to a method of conditioning tanned sharkskin and to articles made therefrom.

The outer covering used in astronaut's suits, boots, and gloves must provide the astronaut with adequate abrasion protection during lunar exploration. Information on the lunar surface indicates the surface may be a gaseous melt-type volcanic rock, somewhat similar to "feather rock" (gaseous melt lava found on earth). The extreme temperature ranges (−250° F. to 300° F.) of the lunar surface necessitates that the abrasion resistant materials also maintain their pliability over the imposed temperature extremes.

Initial selection of abrasion resistant candidate materials was accomplished by manually rubbing samples over a feather rock surface. Candidate materials evaluated were: 6-oz. "Nomex" cloth (used on Gemini extra-vehicular gloves), silicone rubber compounds, neoprene coated nylon cloth, stainless steel cloth, chamois skin, cowhide, calfskin, and sharkskin. Of the materials tested, the sharkskin had the highest abrasion resistance. A Taber Abrasion Test was performed on sharkskin (as received from the tanner) in order to quantitatively measure the abrasion resistance. With identical abrading conditions, sharkskin was 120 times more abrasion resistant than the Nomex material.

A subjectively evaluated cold test performed by dipping the more abrasion resistant materials into liquid nitrogen indicated silicone rubber compounds, cowhide, and sharkskin (as received from the tanner) to be stiff or brittle.

Because of its high abrasion resistance, sharkskin was chosen for further development and evaluation. However, the following problem areas were noted during preliminary testing:

(a) Stiffening at liquid nitrogen temperatures.
(b) Stiffening when exposed to high temperatures and vacuums for extended periods of time.
(c) Shrinking at elevated temperatures.
(d) Undesirable fish odor.

Accordingly, it is an object of the present invention to provide a method of conditioning tanned sharkskin which preserves its abrasion characteristics while essentially eleminating its tendency to stiffen at extremely low temperatures or when exposed to high temperatures and vacuum for extended periods of time, shrink at elevated temperatures, and its undesirable fish odor.

Another object is to provide a flexible, durable abrasion resistant material for use as an outer covering for articles used in extreme environmental conditions.

To accomplish these and other objects which will be apparent from the detailed descripiton, the present invention comprises in general removing the oils which cause stiffening at low temperatures, deodorizing the dehydrated skin and then preshrinking it to eliminate appreciable shrinkage during usage. Sharkskin so processed exhibited no severe stiffening when exposed to simulated lunar thermal loads at approximately $10^{-5}$ torr for 11 hours.

Tanned "Baby Eastern Shark" sharkskin was obtained from Ocean Leather Corporation, Newark, N.J. The sharkskin, including the shagreen layer, had a nominal thickness of .035 inch. Various approaches were tried to remove the oils, deodorize, and preshrink. Desirable results were obtained by using the following method:

(a) Soaking the tanned sharkskin for approximately fifteen minutes in a halo hydrocarbon solvent. A solvent composed of trichlorotrifluoroethane was found particularly effective and not deleterious to the fibers of the sharkskin. (One such solvent is sold under the trademark Freon T.F.).
(b) Air drying thoroughly in a slight flow of air.
(c) Applying a deodorizer to the oil-free, air-dried sharkskin. A deodorizer found to be particularly effective is sold under the trademark "Lysol" which is composed of o-phenylphenol 0.1%, N-alkyl ($C_{18}$ 92%; $C_{16}$ 8%)-N-ethyl morpholinium ethylsulfates 0.035%, alcohol 67.748%. Inert ingredients: 32.117%.
(d) Air drying the deodorized sharkskin thoroughly in a slight flow of air.
(e) Subjecting the dried, deodorized sharkskin to approximately 300° F. temperature for approximately 30 minutes.

It was found empirically that 70–80% of the total expected shrinkage takes place in about one-half hour and that the 300° F. temperature for such time duration does not affect the physical properties of the sharkskin.

Sharkskin so processed was compared in a Universal wear test (as per Federal Specification CC–191B) with SS–304 stainless steel fabric. The conditioned sharkskin only had a 4% loss in thickness after 25,000 cycles, whereas the stainless steel fabric broke after 37 cycles.

It was found that tanned sharkskin so processed did not lose its excellent abrasion resistant characteristics, and that it remained flexible at extremely low temperatures and when exposed to high temperatures and vacuum for extended periods of time. Moreover, after such processing the undesirable fish odor was eliminated.

Therefore, articles made from material so processed being durable, abrasive resistant, and having the capability of remaining flexible under extremes of temperature are useful, not only for lunar exploration, but also other conditions where abrasive resistance under extreme environmental conditions is required.

What is claimed and desired to be secured by Letters Patent is:

1. An outer covering material for boots, gloves, and other like articles for use in hostile environments, said material formed from tanned sharkskin by:
   soaking the tanned sharkskin in a solvent composed of trichlorotrifluoroethane to remove the oils therefrom;

applying a deodorizer composed of o-phenylphenol 0.1%, N-alkyl ($C_{18}$ 92%; $C_{16}$ 8%)-N- ethyl morpholinium ethylsulfates 0.035%, alcohol 67.748%. Inert ingredients: 32.117%; and baking the sharkskin at about 300° F. for about thirty minutes to preshrink the sharkskin.

References Cited

UNITED STATES PATENTS

| | | | |
|---|---|---|---|
| 1,947,522 | 2/1934 | Fluss | 8—139.1 X |
| 1,961,740 | 6/1934 | Conquest | 8—94.15 X |
| 2,168,478 | 8/1939 | Hyde et al. | 8—94.2 X |
| 3,042,479 | 7/1962 | Lawrence et al. | 252—171 X |

OTHER REFERENCES

Pittard: Journal of the Industrial Society of Leather Trades Chemists, September, 1945, pp. 199–204.

MAYER WEINBLATT, Primary Examiner

M. HALPERN, Assistant Examiner